3,580,819
RECOVERY OF PROPYLENE AND PROPYLENE OXIDE BY SELECTIVE SEPARATION WITH PLURAL STAGE DISTILLATION, PROPYLENE OXIDE ABSORPTION AND SUBSEQUENT DISTILLATION
Sadok E. Hoory, El Cerrito, Stanley F. Newman, San Francisco, and Robert E. Vincent, Lafayette, Calif., assignors to Shell Oil Company, New York, N.Y.
Filed Apr. 21, 1969, Ser. No. 817,721
Int. Cl. B01d 3/34; C07c
U.S. Cl. 203—42
4 Claims

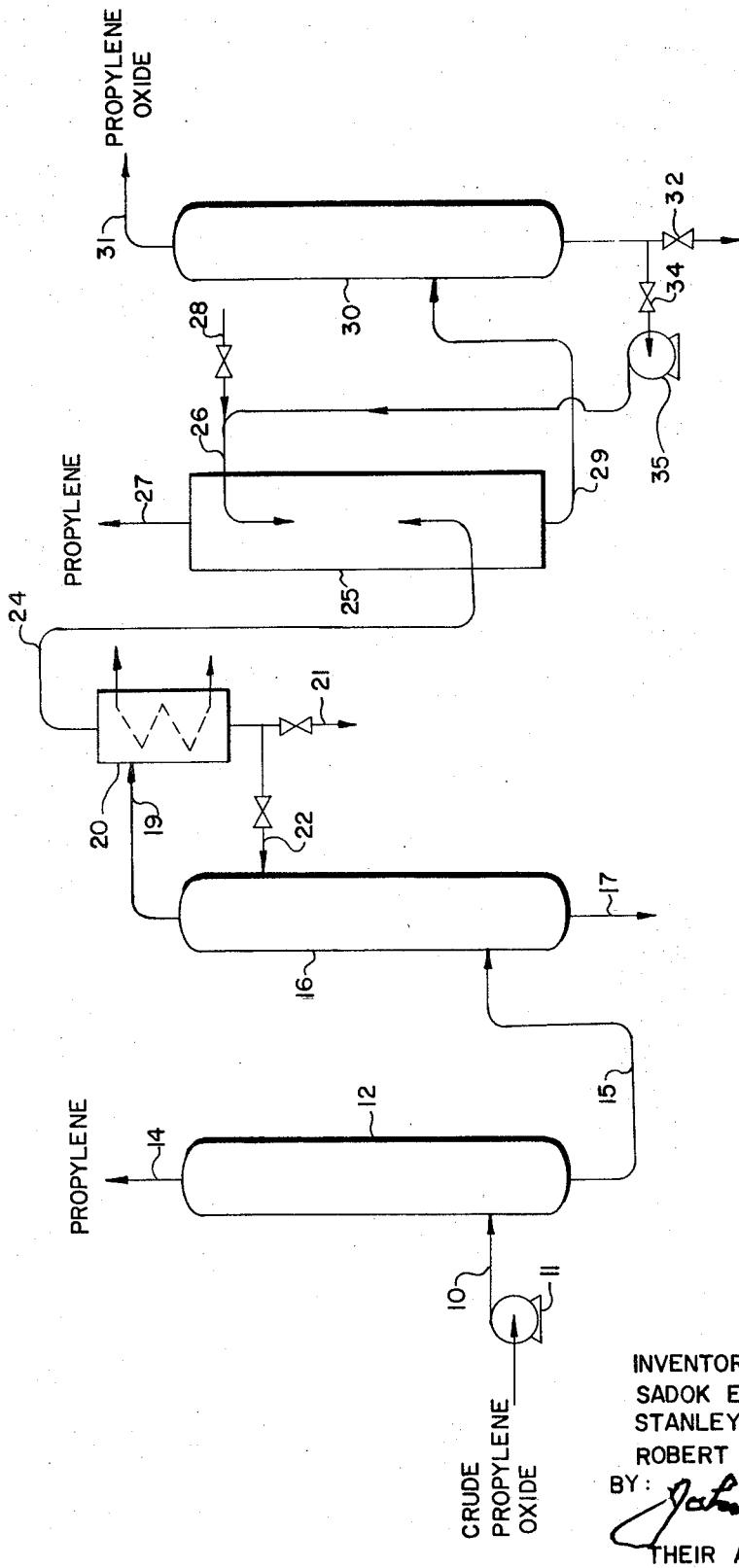

ABSTRACT OF THE DISCLOSURE

Propylene oxide and propylene are separately recovered, in a high state of purity, from a crude propylene oxide, produced by reaction of propylene with an organic hydroperoxide, and containing the propylene oxide in admixture with unconverted propylene, water and higher boiling oxygen-containing organic impurities, by subjecting the crude propylene oxide to a two stage distillation, in the first stage of which propylene is taken overhead under controlled conditions resulting in the wilfull retention of a substantial amount of the propylene in the distillation bottoms and in the second stage of which propylene oxide is taken overhead in admixture with propylene, and separating propylene oxide from the second stage distillation overhead by selective absorption in an aqueous solvent.

BACKGROUND OF THE INVENTION

This invention relates to the resolution of crude propylene oxide-containing mixtures produced by the epoxidation of propylene with the aid of an organic hydroperoxide.

Recent discoveries have resulted in catalytic processes enabling the efficient direct production of propylene oxide-containing reaction mixtures by reaction of propylene with an organic hydroperoxide. The significant advantages inherent in the practical scale application of processes of this type are, however, dependent to at least a substantial degree upon the ability to recover efficiently not only the propylene oxide but also the unconverted propylene. In the epoxidation of propylene oxide by reaction of propylene with an organic hydroperoxide in the presence of a suitable catalyst there is generally separated from the reactor effluent a crude propylene oxide comprising the propylene oxide in admixture with unconverted propylene, water and higher boiling oxygen-containing organic impurities. The specific composition of the higher boiling impurities may vary considerably depending upon the specific charge materials and epoxidation conditions employed in the reaction system. Their complexity often renders difficult identification of components. They do, however, generally comprise aldehydes, ketones, ethers, alcohols and often minor amounts of organic hydroperoxides and/ or peroxidic materials. Although these higher boiling oxygen-containing impurities are generally present in the crude propylene oxide mixture in only minor amounts they nevertheless influence considerably the degree of resolution which can be attained. A highly desirable feature of a practical scale recovery operation is that it not only enables the recovery of the unconverted propylene efficiently in a high state of purity but effects the recovery at pressure conditions enabling recycling of propylene to take place in the absence of costly repressuring means.

Characteristics peculiar to the crude propylene oxide mixtures obtained from processes wherein propylene is reacted with an organic hydroperoxide render impractical, and often impossible, the use of methods heretofore resorted to effect the revovery of the propylene oxide. Thus the use of distillation conditions wherein all of the lighter constituents (i.e., propylene, water and propylene oxide) are taken overhead in the first distillation generally result in conditions of temperature and pressure in the distillation bottoms which not only can occasion the loss of substantial amounts of the propylene oxide and coproducts and unreacted organic hydroperoxide by further reaction, but also which are hazardous because of the unstable nature of compounds of the higher boiling impurities often present, such as hydroperoxides, even though only in trace amounts. Tempering the conditions prevailing in the distillation zone by reliance upon reduction of pressure generally necessitates a degree of temperature reduction which unavoidably results in the deposition of ice and/or hydrates in the system thereby rendering the operation highly impractical. Highly expensive increases in the size of practical scale distillation and repressuring means generally also result from operation at such reduced pressures.

STATEMENT OF THE INVENTION

It has now been found that the above difficulties are obviated to at least a substantial degree and crude propylene oxide mixtures obtained by epoxidation of propylene with organic hydroperoxides are resolved with improved efficiency in a novel recovery procedure comprising a two stage distillation in combination with an aqueous solvent absorption.

In accordance with the process of the invention propylene oxide and propylene are recovered in a high state of purity from a crude propylene oxide, produced by catalytic reaction of propylene with an organic hydroperoxide and containing the propylene oxide in admixture with unconverted propylene, water and higher boiling oxygen-containing impurities, by (a) subjecting the crude propylene oxide to distillation in a first distillation stage, in which propylene is taken overhead under controlled conditions resulting in the wilfull retention of a substantial amount of the propylene in the distillation bottoms, (b) subjecting the distillation bottoms from the first distillation stage to distillation in a second distillation stage in which propylene oxide is taken overhead in admixture with propylene, and (c) separating propylene from the second overhead distillation stage by selective absorption of propylene oxide in an aqueous solvent.

Propylene oxide is distilled from the rich aqueous absorbate in a high state of purity. The unconverted propylene is recovered in a high state of purity as overhead from the first distillation zone and from the absorption zone.

The invention is described in further detail herein with reference to the attached drawing wherein the single figure represents more or less diagrammatically one form of apparatus suitable for carrying out the process of the invention.

DETAILED DESCRIPTION OF THE INVENTION

Although the invention is applied broadly to the resolution of mixtures comprising propylene oxide in admixture with propylene, water and higher boiling oxygen containing impurities, it is applied with particular advantage to the recovery of propylene oxide and propylene in a high state of purity from crude propylene oxide-containing mixtures obtained in processes wherein propylene is reacted with an organic hydroperoxide in the presence of a suitable catalyst. Such processes comprise those described and claimed in commonly assigned copending applications of Wulff et al., Ser. Nos. 812,920, 812,922, 812,923, and 812,924, filed Apr. 2, 1969. The crude propylene oxide-containing mixtures charged to the process of the invention comprise those obtained by subjecting the total reaction products from the suitable propylene epoxidation process to initial crude propylene oxide recovery means which may comprise such steps as for example distillation, fractionation, decantation and the like to effect the removal of at least a substantial part of any entrained catalyst, solvent and part of the undesired byproducts from the crude propylene oxide to be subjected to the subject separation process. The crude propylene oxide so obtained will generally comprise unconverted propylene in substantial excess. In general, the suitable crude propylene oxide charge to the process of the invention will comprise from about 5 to about 60% propylene to preferably from about 10 to about 30% by weight of propylene. The crude propylene oxide charged to the process of the invention may additionally comprise hydrocarbons of paraffinic or aromatic character corresponding to the hydrocarbon moiety of the organic hydroperoxide employed in the oxidation. Such hydrocarbon components may comprise for example, isoparaffins such as isopentane, isobutane; alkyl benzenes such as ethylbenzene, cumene; as well as homologs thereof, etc.

Essential to the objects of the invention is the subjection of the crude propylene oxide charge to distillation conditions in the first stage of the two distillation zones resulting in the wildlife retention of at least a substantial part of the propylene in the distillation bottoms, comprising the propylene oxide and higher boiling oxygen-containing impurities. Suitable distillation conditions comprise those resulting in a distillation bottoms having a propylene content of from about 1 to about 20% by weight and preferably from about 2 to about 10% by weight.

The first stage of the two stage distillation is preferably carried out with a distillation column tops pressure of from about 75 to about 400 p.s.i.g. and preferably from about 100 to about 300 p.s.i.g. Higher or lower pressures may, however, be employed in the first stage of the two stage distillation zone within the scope of the invention.

Bottoms from the first stage of the two stage distillation propylene oxide and higher boiling oxygen containing organic impurities as well as other hydrocarbon somponents of the charge, are charged to the second stage of the two stage distillation zone. In the second stage of the two stage distillation zone conditions are controlled to effect the distillation overhead of a fraction consisting essentially of the propylene oxide in admixture with propylene. Liquid bottoms comprising the higher boiling oxygen-containing organic impurities are withdrawn from the second stage of the two stage distillation and eliminated from the system.

Overhead from the second stage of the two stage distillation zone consisting essentially of propylene oxide in admixture with propylene and water is introduced into an absorption zone wherein it is contacted with a suitable selective solvent for the propylene oxide. Suitable selective solvents comprise aqueous solvents, water being generally preferred. Unabsorbed propylene is withdrawn from the absorption zone in high purity particularly suitable for recycling to the epoxidation zone. Propylene oxide in a high state of purity is distilled from the rich absorbate.

In a modification of the invention, solvents, comprising for example ethylbenzene, water, and the like may be introduced into either one or both stages of the two stage distillation. The solvents so used generally have boiling temperatures which are sufficiently high to be retained as diluents in the liquid bottoms of the second stage of the distillation.

The invention will be further described by the following example wherein reference will be made to the figure.

EXAMPLE I

A crude propylene oxide having the following composition:

| | Percent wt. |
|---|---|
| Propylene | 20.5 |
| Propane | 3.8 |
| Water | 0.6 |
| Propylene oxide | 8.1 |

Higher boiling organic impurities:

| | |
|---|---|
| Methyl-phenyl carbinol | 18.8 |
| Methyl-phenyl ketone | 6.6 |
| Ethylbenzene | 41.0 |
| Ethylbenzene hydroperoxide | 0.5 | is produced by the reaction of ethylbenzene-diluted ethylbenzene hydroperoxide, in liquid phase, at a temperature of 110° C. with an excess of propylene in a continuous reactor having fixed bed of titanium oxide-silica heterogeneous catalyst substantially as described and claimed in copending application Ser. No. 812,920.

The crude propylene oxide so obtained is forced through line 10 with the aid of pump 11 into fractionator 12. Fractionator 12 is operated at a kettle pressure of 110 p.s.i.g. and a kettle temperature of 135° C. Conditions within fractionator 12 are controlled to produce an overhead consisting essentially of propylene and a liquid bottoms of the following approximate composition:

| | Percent wt. |
|---|---|
| Propylene | 3.9 |
| Propane | 0.7 |
| Water | 0.7 |
| Propylene oxide | 10.2 |

Higher boiling organic impurities:

| | |
|---|---|
| Methyl-phenyl carbonol | 23.8 |
| Methyl-phenyl ketone | 8.4 |
| Ethylbenzene | 51.8 |
| Ethylbenzene hydroperoxide | 0.6 |

Overhead is removed through line 14. Liquid bottoms are passed from fractionator 12 through line 15 into fractionator 16. Conditions within fractionator 16 are controlled to produce an overhead consisting essentially of propylene, propylene oxide and water and a liquid bottoms consisting of higher boiling organic impurities. Fractionator 16 is operated at a kettle pressure of about 35 p.s.i.g. Liquid bottoms are removed from fractionator 16 through line 17. Overhead is removed from fractionator 16 as a vapor through line 19 and passed through condensor 20 wherein a minor amount of overhead is condensed and either removed from the system through line 21 or optionally returned to fractionator 16 as reflux through line 22. A major portion of fractionator overhead is removed from condenser 20 and transferred through line 24 as a vapor to absorber 25 where it ascends countercurrently to an aqueous absorbate stream. Lean aqueous absorbate is charged to absorber 25 through line 26, absorber 25 is operated at a temperature of about 120° C. Non-absorbed vapor is removed from absorber 25 through line 27. Propylene oxide-rich aqueous absorbate is removed from absorber 25 through line 29 and passed to fractionator 30. Fractionator 30 is operated at conditions such that an overhead consisting essentially of propylene oxide is separated and removed from fractionator 30 through line 31. A liquid bottom consisting essentially of propylene oxide-free aqueous absorbate is separated in fractionator 30 and removed through line 32 or preferably optionally to line 26 by means of line 34 with the aid of pump 35. Make-up absorbate is added via valved line 28.

I claim as my invention:

1. The process for recovering propylene and propylene oxide in high state of purity from a crude propylene oxide comprising propylene oxide, propylene, water and higher boiling oxygen-containing impurities comprising:

(a) subjecting said crude propylene oxide to a first distillation to obtain a first distillation overhead consisting essentially of propylene, and first liquid bottoms comprising propylene oxide in admixture with propylene, water and said impurities, said first liquid bottoms comprising at least about 1% by weight propylene, (b) subjecting said first liquid bottoms to a second distillation to obtain a second distillation overhead consisting essentially of propylene oxide in admixture with propylene and water, and a second liquid bottoms comprising said higher boiling materials, and (c) contacting said second distillation overhead with a liquid aqueous selective solvent for propylene oxide and distilling propylene oxide from the resulting fat solvent.

2. The process according to claim 1 wherein said first distillation is executed at a pressure in the range of from about 75 to about 400 p.s.i.g.

3. The process according to claim 2 wherein said first distillation is controlled to obtain a first liquid bottoms containing from about 1 to about 20% by weight propylene.

4. The process according to claim 2 wherein said first distillation is controlled to obtain a first liquid bottoms containing from about 2 to about 10% by weight propylene.

References Cited
UNITED STATES PATENTS

| | | | |
|---|---|---|---|
| 3,135,669 | 6/1964 | Taggart | 203—80 |
| 3,350,419 | 10/1967 | Null et al. | 203—42 |
| 3,398,062 | 8/1968 | Tsao | 203—80 |
| 3,427,229 | 2/1969 | Herzog | 260—348.5L |
| 3,449,219 | 6/1969 | Schmidt | 260—348.5L |
| 3,452,055 | 6/1969 | Golden et al. | 260—348.5L |

WILBUR L. BASCOMB, Jr., Primary Examiner

U.S. Cl. X.R.

203—80; 260—248.5L, 677A